United States Patent
Salter et al.

(10) Patent No.: US 12,065,068 B2
(45) Date of Patent: Aug. 20, 2024

(54) VEHICLE CONSOLE HAVING DEPLOYABLE HEATED SHELF

(71) Applicant: Ford Global Technologies, LLC, Dearborn, MI (US)

(72) Inventors: Stuart C. Salter, White Lake, MI (US); Paul Kenneth Dellock, Northville, MI (US); Dustin Shedlarski, Commerce Township, MI (US); Micah Jones, Pleasant Ridge, MI (US); Hussein H. Berry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 358 days.

(21) Appl. No.: 17/734,163

(22) Filed: May 2, 2022

(65) Prior Publication Data
US 2023/0347803 A1     Nov. 2, 2023

(51) Int. Cl.
| B60N 3/10 | (2006.01) |
| B60N 3/00 | (2006.01) |
| B60Q 3/20 | (2017.01) |
| B60Q 3/70 | (2017.01) |

(52) U.S. Cl.
CPC ............. *B60N 3/104* (2013.01); *B60N 3/001* (2013.01); *B60Q 3/20* (2017.02); *B60Q 3/70* (2017.02)

(58) Field of Classification Search
CPC ........ B60N 3/104; B60N 3/001; B60N 3/002; B60R 7/04; B60R 2011/0007; B60R 13/0262; B60Q 3/20; B60Q 3/225; B60Q 3/229; B60Q 3/70; B60H 1/00592

USPC ............. 296/1.07, 24.34, 24.35, 37.8, 37.14; 62/159, 3.3; 165/41
See application file for complete search history.

(56) References Cited

U.S. PATENT DOCUMENTS

| 5,203,833 A * | 4/1993 | Howell ................... B60N 3/104 |
| | | 165/41 |
| 2007/0101741 A1* | 5/2007 | Kukucka .................. B60R 7/06 |
| | | 62/434 |
| 2008/0209912 A1 | 9/2008 | Upadhye et al. |
| 2009/0058120 A1* | 3/2009 | Ioka .......................... B60R 7/04 |
| | | 296/24.35 |
| 2009/0072782 A1* | 3/2009 | Randall ................... G06F 1/263 |
| | | 307/104 |
| 2011/0095557 A1* | 4/2011 | Myers ..................... B60N 3/102 |
| | | 296/37.8 |
| 2014/0103129 A1 | 4/2014 | Ray et al. |
| 2021/0094455 A1 | 4/2021 | Vite Cadena et al. |
| 2022/0144177 A1* | 5/2022 | Thomas .................... B60R 7/04 |
| 2024/0067096 A1* | 2/2024 | Fukui ....................... B60R 7/04 |

* cited by examiner

*Primary Examiner* — Amy R Weisberg
*Assistant Examiner* — Wenwei Zhuo
(74) *Attorney, Agent, or Firm* — Vichit Chea; Price Heneveld LLP

(57) ABSTRACT

A vehicle console includes a housing having at least one cupholder, a deployable shelf located proximate to the housing and movable between a recessed position in thermal communication with the at least cupholder and an extended position extending outward from the housing. The deployable shelf has a thermally conductive surface, and a heater operatively coupled to the thermally conductive surface.

20 Claims, 3 Drawing Sheets

VEHICLE CONSOLE HAVING DEPLOYABLE HEATED SHELF

FIELD OF THE DISCLOSURE

The present disclosure generally relates to passenger vehicles, and more particularly relates to consoles having one or more cupholders and heated accessories on a vehicle.

BACKGROUND OF THE DISCLOSURE

Motor vehicles are commonly equipped with a plurality of cupholders each generally configured to hold a beverage container. Vehicles are also typically configured to include consoles such as a center console having one or more cupholders. It would be desirable to provide for a heated accessory on the vehicle associated with the cupholder.

SUMMARY OF THE DISCLOSURE

According to a first aspect of the present disclosure, a vehicle console is provided. The vehicle console includes a housing having at least one cupholder, a deployable shelf located proximate to the housing and movable between a recessed position in thermal communication with the at least cupholder and an extended position extending outward from the housing, wherein the deployable shelf has a thermally conductive surface, and a heater operatively coupled to the thermally conductive surface.

Embodiments of the first aspect of the present disclosure can include any one or a combination of the following features:
  the shelf is located below the at least one cupholder such that the thermally conductive surface is positioned below and thermally coupled to the at least one cupholder in the recessed position;
  the shelf is movable by sliding within an opening between the recessed and extended positions;
  the thermally conductive surface in the extended position of the shelf is configured to support items to be heated;
  the console is a center console positioned between first and second seats in a vehicle;
  a light bar positioned on the thermally conductive surface;
  the light bar provides an illuminated light indicative of a temperature of the thermally conductive surface;
  a magnetic surface provided on the shelf; and
  the heater comprises a Peltier device.

According to a second aspect of the present disclosure, a vehicle console is provided. The vehicle console includes a housing having at least one cupholder, and a deployable shelf located proximate to the housing and movable between a recessed position in thermal communication with the at least cupholder and an extended position extending outward from the housing, wherein the deployed shelf has a thermally conductive surface configured to support items to be heated. The vehicle console also includes a heater operatively coupled to the thermally conductive surface, wherein the shelf is located below the at least one cupholder such that the thermally conductive surface is positioned below and is thermally coupled to the at least one cupholder in the recessed position, wherein the shelf is movable by sliding within an opening between the recessed and extended positions.

According to a third aspect of the present disclosure, a vehicle is provided that includes a body defining a cabin interior, and a vehicle console disposed within the cabin interior. The vehicle console includes a housing having at least one cupholder, a deployable shelf located proximate to the housing and movable between a recessed position in thermal communication with the at least cupholder and an extended position extending outward from the housing, wherein the deployable shelf has a thermally conductive surface, and a heater operatively coupled to the thermally conductive surface.

Embodiments of the second aspect of the present disclosure can include any one or a combination of the following features:
  the shelf is located below the at least one cupholder such that the thermally conductive surface is positioned below and proximate to the at least one cupholder in the recessed position;
  the shelf is movable by sliding within an opening between the recessed and extended positions;
  the thermally conductive surface in the extended position of the shelf is configured to support items to be heated;
  a light bar positioned on the thermally conductive surface;
  the light bar provides an illuminated light indicative of a temperature of the thermally conductive surface;
  a magnetic surface provided on the shelf;
  the heater comprises a Peltier device;
  a first seat and a second seat within the cabin interior, wherein the vehicle console is disposed between the first and second seats; and
  the vehicle console is a center console.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
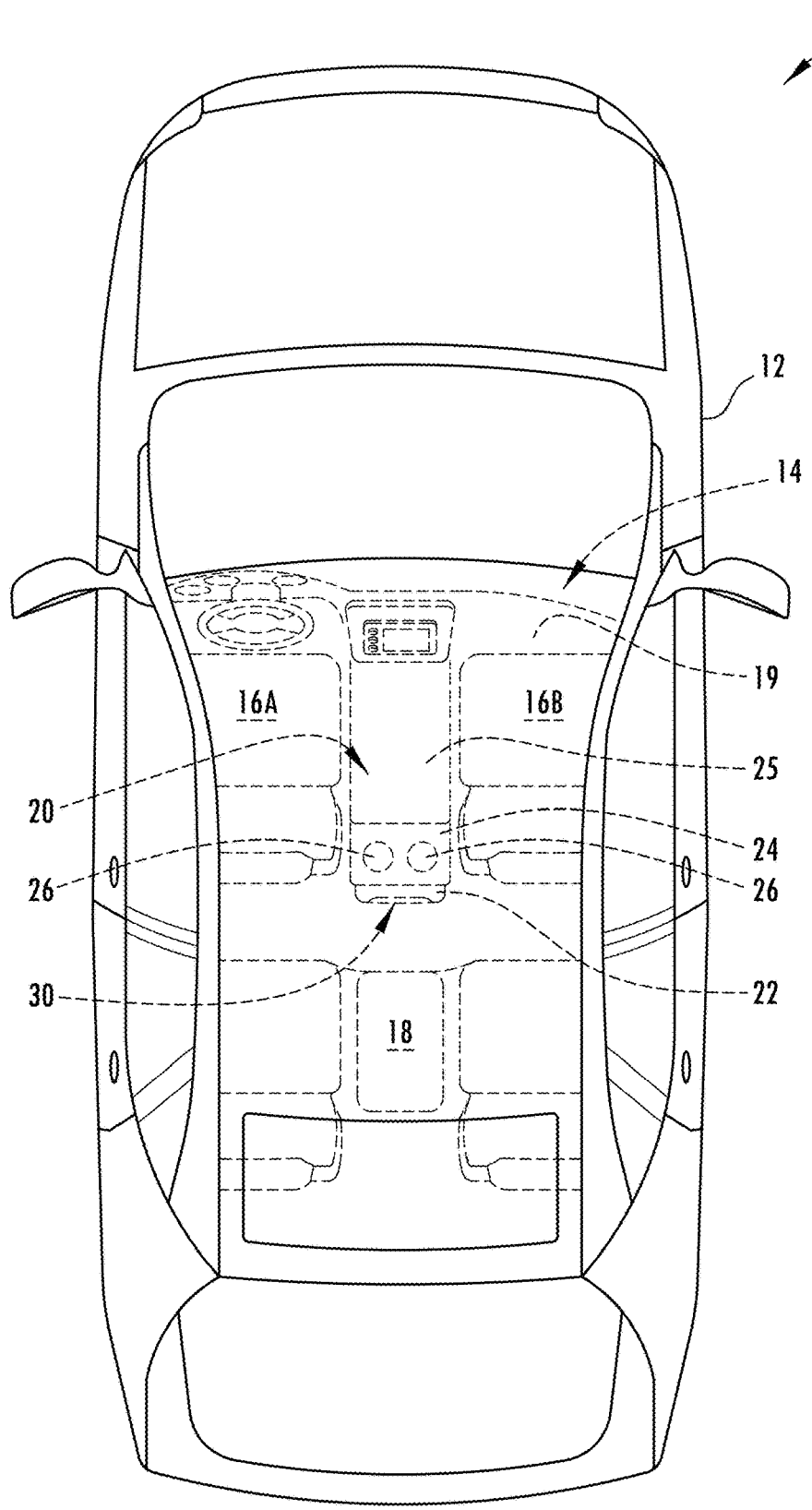
FIG. 1 is a top schematic view of a motor vehicle equipped with a vehicle console having cupholders and a deployable heated shelf, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design;

some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle and vehicle console having a deployable heated shelf. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with passenger seating and accommodations for transporting one or more passengers including a driver of the vehicle 10. The motor vehicle 10 has a vehicle body 12 that generally defines a cabin interior 14. The cabin interior 14 may contain various features and trim components within the vehicle body 12. The cabin interior 14 is shown having an arrangement of passenger seats including a first or front row of driver and passenger seats 16A and 16B and a second or rear row of seats 18 which may be configured as a bench or split bench seating or captain seats, for example. The vehicle 10 may also include additional rows of seating as is the case for a typical large SUV, van or bus. The vehicle body 12 further defines a floor 19 upon which the seats 16A, 16B and 18 are assembled and supported. It should be appreciated that the vehicle 10 may be a motor vehicle, such as a wheeled car, truck, SUV, van or bus, for example, or an airplane, train, boat or other vehicle capable of transporting one or more passengers and personal items.

The motor vehicle 10 is equipped with a console shown and described herein in one example as a center console 20, located between a first seat arranged as the front row driver seat 16A and a second seat arranged as a passenger seat 16B. The center console 20 is supported on the floor 19 and may extend forward towards or near a dashboard at the front of the cabin interior 14 and may extend rearward to a position within reach of one or more passengers seated in the rear row of seats 18. Located on the center console 20, near a rearward portion of the center console 20, is at least one cupholder 26. In the example shown, two cupholders are illustrated. However, it should be appreciated that the center console 20 may include one or more cupholders located near the rear side, front side, lateral sides or other locations on the center console 20.

Figure 2:
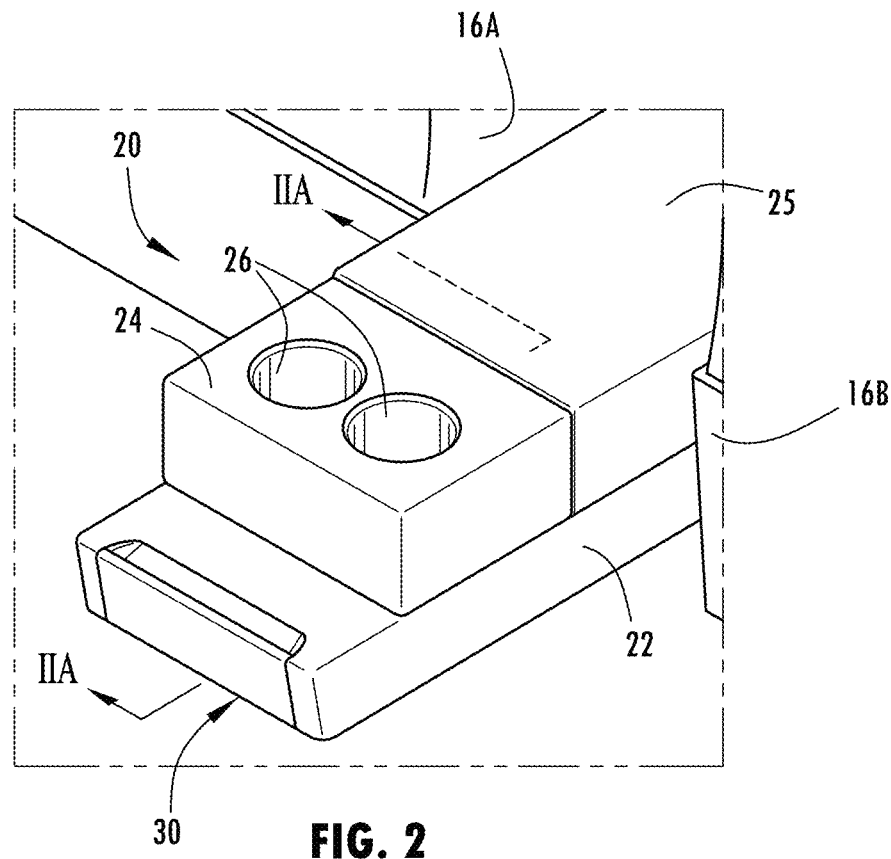
FIG. 2 is an enlarged perspective view of the vehicle console with the deployable heated shelf in a recessed position.
Figure 2A:
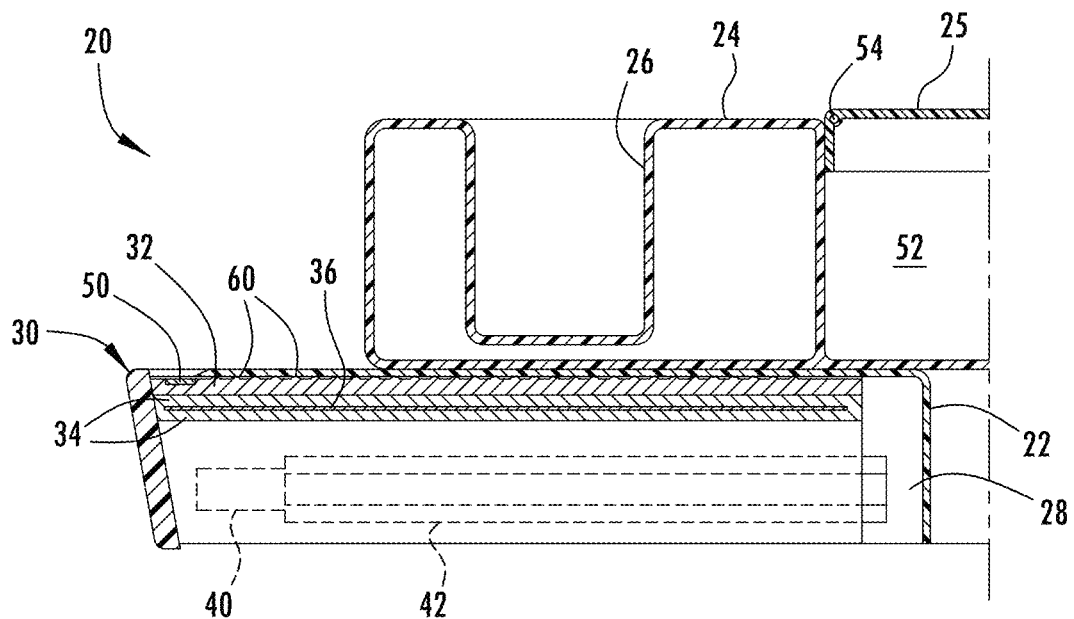
FIG. 2A is a cross-sectional view taken through line IIA-IIA of FIG. 2 further illustrating the deployable heated shelf in the recessed position.

Referring to FIGS. 2 and 2A, the center console 20 is further illustrated having the cupholders 26 arranged side-by-side, each configured having a shape and size to sufficiently receive and hold a drink container, such as a drink cup, bottle, mug or tumbler, for example, and other items. The cupholders 26 may each have a cylindrical or truncated cone shape, for example, and may have engagement features to hold a drink container placed therein steady. In the example shown, the two cupholders are located near a rearward portion of the console 20 and are generally accessible to passengers seated in the rear or second row of seating 18. However, it should be appreciated that the cupholders 26 may otherwise be positioned on a forward portion of the console 20 and accessible to the driver of the vehicle and front passenger seated on seats 16A and 16B, according to other embodiments.

The center console 20 generally includes an upper housing 24 which has a lid 25 that may pivot about a hinge 54 at one end, such as at the rear end, between a closed position as shown and an open position allowing access to a storage compartment 52 located in a lower housing 22. The center console 20 includes the lower housing 22 which may be supported by the vehicle floor 19 and define the storage compartment 52. The lid 25 on the upper housing 24 may be latched to the lower housing 22 in the closed position. The lower housing 22 and upper housing 24 may be made of a polymeric material and the lid 25 may also serve as an armrest in the closed position.

Figure 3:
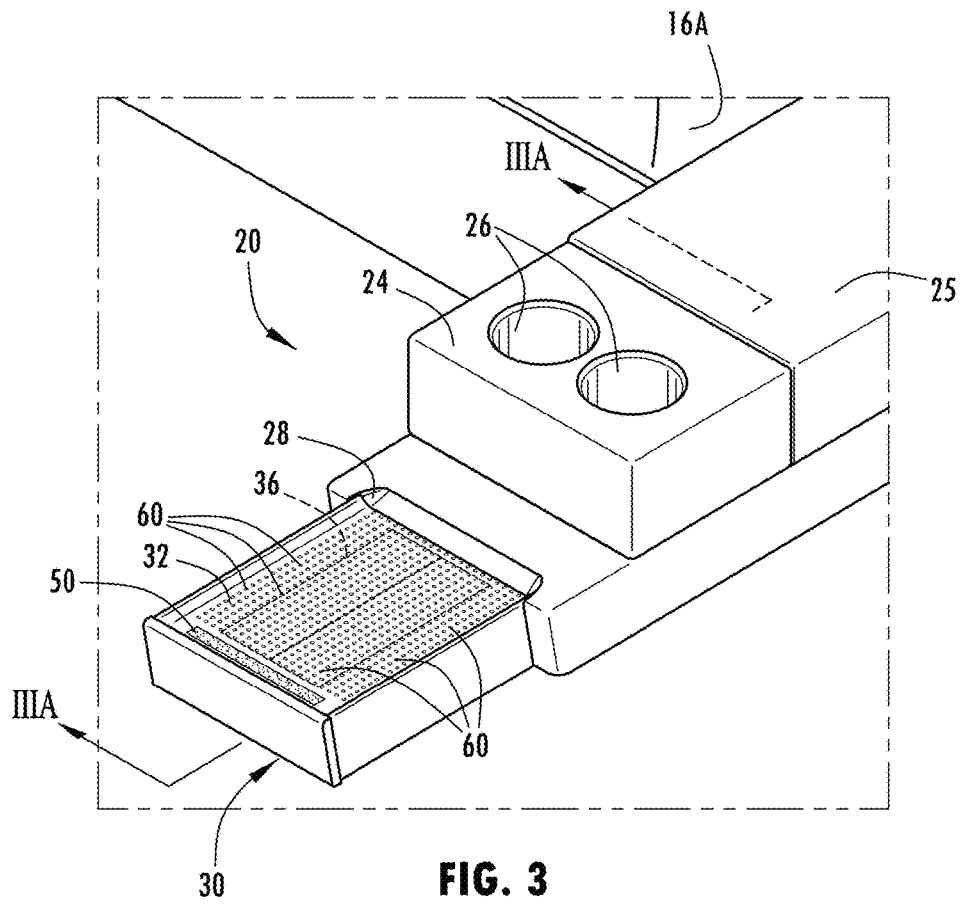
FIG. 3 is an enlarged perspective view of the vehicle console with the deployable heated shelf in an extended position and configured to hold items.
Figure 3A:
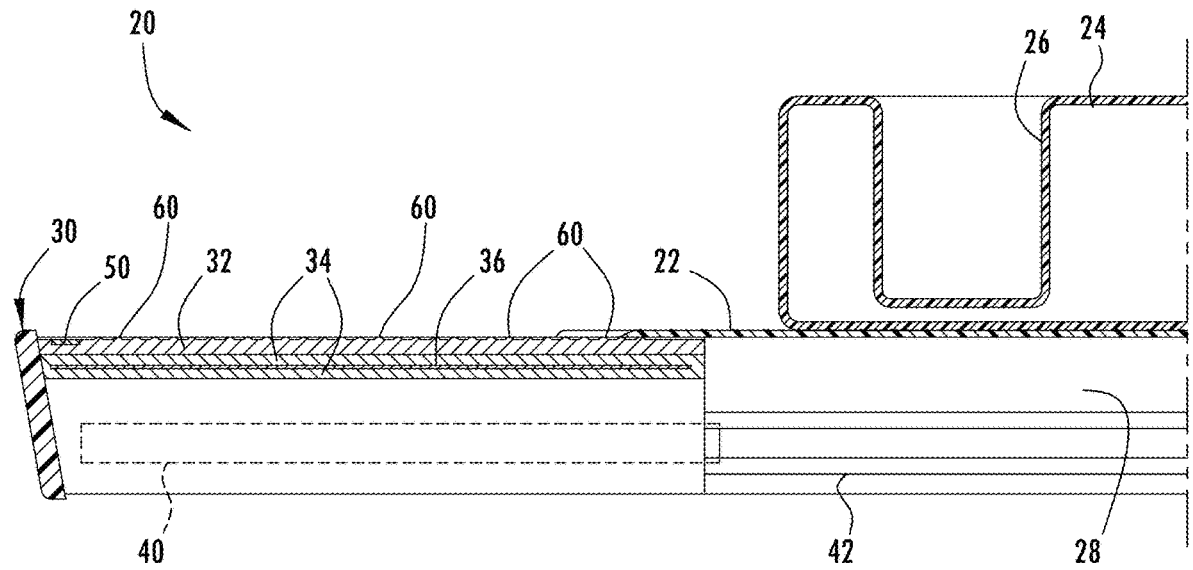
FIG. 3A is a cross-sectional view taken through line IIIA-IIIA of FIG. 3 further illustrating the deployable heated shelf in the extended position.

Referring to FIGS. 2-3A, the vehicle console 20 is shown having a deployable heated shelf 30 that is proximate to and located within an opening 28 in the lower housing 22. The deployable heated shelf 30 is movable between a recessed position stowed substantially within the lower housing 22 as shown in FIGS. 2 and 2A and an extended position extending outward from the lower housing 22 as shown in FIGS. 3 and 3A. As such, the deployable heated shelf 30 slidably moves longitudinally within the opening 28 in the lower housing 22 between the two positions.

Referring particularly to FIGS. 2 and 2A, the deployable heated shelf 30 is shown in the recessed position generally fully disposed within opening 28 of lower housing 22. In this position, the deployable heated shelf 30 is positioned below the cupholders 26 and is preferably close to the cupholders 26 and may be interference fit into the bottom side of the cupholders 26. The deployable heated shelf 30 has a pair of rails 40 located on opposite lateral sides that engage a track 42 on walls within the lower housing 22. As such, the heated shelf 30 slides with rails 40 engaged within tracks 42 between the recessed and extended positions. It should be appreciated that the rails 40 may further include wheels or other rollers for providing reduced friction travel of the deployable heated shelf 30 between the recessed and extended positions. Other sliding assemblies are also contemplated for allowing the deployable heated shelf 30 to move between the recessed and extended positions.

The deployable heated shelf 30 has a thermally conductive top layer 32. Located directly below the thermally conductive layer 32 is a thermally conductive electrical insulation layer 34 which encapsulates a heater 36. The heater 32 may be an electric powered heater receiving electrical energy from a vehicle battery. The heater 36 may be a Peltier device such as a Peltier thermoelectric cooler/heater which operates as a heat pump that transfers heat from one side of the device to the other, according to one example. As such, the heater 36 may be energized to generate thermal energy (heat) that is conducted through the thermally conductive electrical insulation layer 34 and the thermally conductive layer 32. As such, when the heater 36 is energized to generate heat, the top surface of the heated shelf 30 is thereby heated to an elevated temperature such as in the range of 110 to 150° F, for example. When the shelf 30 is in the recessed position, a top surface 60 of thermally conductive layer 30 is thermally coupled to and in close contact with very close (e.g., within 2 mm) to the bottom surface of the cupholder 26 such that the top surface 60 of the thermally conductive layer 32 is in thermal communication with the cupholders 26. As a result, when the heater 36 generates heat, the thermal energy from the thermally conductive layer 32 heats the bottom of the cupholders 26 when the heated shelf 30 is in the recessed position.

The thermally conductive electrical insulation layer 34 may be molded with liquid silicone that may be modified with thermally conductive ceramic. As such, the insulation layer 34 may conduct thermal energy or heat and is electrically insulated such that it does not conduct electricity. The thermally conductive layer 32 may include a moldable material soft rubber that can withstand elevated temperatures. One example of the thermally conductive layer 32 is a liquid silicone rubber such as Dow SILASTIC™ LTC 9400-40 which is commercially available from Dow Chemical. The top surface 60 may be formed with a pattern of ribs or fingers to provide enhanced functional engagement of items. To make the thermally conductive layer 32 thermally conductive, boron nitride, such as in the amount of 20% by weight may be added. The additional 20% boron nitride may improve the heat transfers significantly. Boron nitride is a ceramic that does not conductive electricity such that it enhances the heat conductivity and maintains the electrical insulation.

The heater 36 may employ a heating element wire, such as an insert molded wire grid made of nickel-chromium alloy Ni80Cr20, for example, which is a resistive element that will heat up when an electrical current is applied across it. Other types of heaters are contemplated, according to other embodiments.

The top surface 60 of the thermally conductive layer 32 may be overmolded with a material that includes a liquid silicone base and a low shore A hardness that is modified with thermally conductive ceramic and a magnetic material. To provide a magnetic top surface, strontium ferrite powder in an amount of about 25% by weight, for example, may be added to the composition of the thermally conductive layer 32. This may be in addition to the 20% by weight boron nitride. The strontium ferrite is a material that is used to provide permanent magnets and will make the top surface 60 magnetic sufficient to hold steel items in place. For example, steel items, such as dividers may be placed on the top surface 60 and held in place via magnetic attraction. This may assist in providing divider walls to hold and retain items that are placed on the top surface 60.

When the heated shelf is extended to the extended position as shown in FIGS. 3 and 3A, the deployable heated shelf 30 provides the exposed top surface 60 on top that may be heated by heater 36 to provide a heated shelf. As such, items to be heated such as food may be placed on the top surface 60 of the thermally conductive top layer 32 and maintained at an elevated temperature. For example, a driver or passenger of the vehicle 10 may place their food on the top surface 60 of the deployable heated shelf 30 in the extended position which provides a warming shelf to ensure that the food remains warm.

It should be appreciated that the deployable heated shelf 30 may be manually moved by sliding between the extended position shown in FIG. 3 and the recessed position shown in FIG. 2, according to the embodiment shown. However, it should be appreciated that the deployable heated shelf 30 may be actuated via an actuator between the recessed and extended positions. For example, a motor or spring biased assisted mechanism may be employed to move the deployable heated shelf 30 from the extended position to the recessed position, from the recessed position to the extended position, or between both the extended and recessed positions in response to a user input.

The deployable heated shelf 30 may further include a light device 50, such as a light bar having one or more light sources such as (light-emitting diodes) LEDs. The light device 50 may illuminate a color of light indicative of the temperature of the thermally conductive surface. The light device 50 may illuminate a red color indicative of an elevated temperature and may illuminate a blue color indicative of a cooler temperature, for example. When a heat pump such as a Peltier device is employed, the electrical current supplied to the Peltier device may be reversed so as to provide a cooling device to cool the top surface 60 in a cooling mode. As such, the light device 50 may serve as an indication of the heating or cooling modes. The light device 50 may include a light bar, a light guide, and/or a light translucent material.

Accordingly, the vehicle 10 advantageously provides at least one cupholder 26 and a deployable heated shelf 30 that may be heated onboard the vehicle 10 to allow passengers to maintain heated drinks and heated items. It should further be appreciated that in addition to heating, the shelf 30 may be configured to provide cooling of items, according to other embodiments.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle console comprising:
    a housing having at least one cupholder;
    a deployable shelf located proximate to the housing and movable between a recessed position in thermal communication with the at least cupholder and an extended position extending outward from the housing, wherein the deployable shelf has a thermally conductive surface; and
    a heater operatively coupled to the thermally conductive surface.

2. The vehicle console of claim 1, wherein the shelf is located below the at least one cupholder such that the thermally conductive surface is positioned below and thermally coupled to the at least one cupholder in the recessed position.

3. The vehicle console of claim 2, wherein the shelf is movable by sliding within an opening between the recessed and extended positions.

4. The vehicle console of claim 3, wherein the thermally conductive surface in the extended position of the shelf is configured to support items to be heated.

5. The vehicle console of claim 1, wherein the console is a center console positioned between first and second seats in a vehicle.

6. The vehicle console of claim 1 further comprising a light bar positioned on the thermally conductive surface.

7. The vehicle console of claim 6, wherein the light bar provides an illuminated light indicative of a temperature of the thermally conductive surface.

8. The vehicle console of claim 1 further comprising a magnetic surface provided on the shelf.

9. The vehicle console of claim 1, wherein the heater comprises a Peltier device.

10. A vehicle console comprising:
    a housing having at least one cupholder;
    a deployable shelf located proximate to the housing and movable between a recessed position in thermal communication with the at least cupholder and an extended position extending outward from the housing, wherein the deployed shelf has a thermally conductive surface configured to support items to be heated; and
    a heater operatively coupled to the thermally conductive surface, wherein the shelf is located below the at least one cupholder such that the thermally conductive surface is positioned below and is thermally coupled to the at least one cupholder in the recessed position, wherein the shelf is movable by sliding within an opening between the recessed and extended positions.

11. A vehicle comprising:
    a body defining a cabin interior; and
    a vehicle console disposed within the cabin interior, the vehicle console comprising:
        a housing having at least one cupholder;
        a deployable shelf located proximate to the housing and movable between a recessed position in thermal communication with the at least cupholder and an extended position extending outward from the housing, wherein the deployable shelf has a thermally conductive surface; and
        a heater operatively coupled to the thermally conductive surface.

12. The vehicle of claim 11, wherein the shelf is located below the at least one cupholder such that the thermally conductive surface is positioned below and proximate to the at least one cupholder in the recessed position.

13. The vehicle of claim 12, wherein the shelf is movable by sliding within an opening between the recessed and extended positions.

14. The vehicle of claim 13, wherein the thermally conductive surface in the extended position of the shelf is configured to support items to be heated.

15. The vehicle of claim 11 further comprising a light bar positioned on the thermally conductive surface.

16. The vehicle of claim 15, wherein the light bar provides an illuminated light indicative of a temperature of the thermally conductive surface.

17. The vehicle of claim 11 further comprising a magnetic surface provided on the shelf.

18. The vehicle of claim 11, wherein the heater comprises a Peltier device.

19. The vehicle of claim 11 further comprising a first seat and a second seat within the cabin interior, wherein the vehicle console is disposed between the first and second seats.

20. The vehicle of claim 19, wherein the vehicle console is a center console.

* * * * *